Patented Dec. 16, 1952

2,622,103

UNITED STATES PATENT OFFICE 2,622,103

UNSATURATED CARBINOL AND PROCESS OF PREPARING SAME

Ronald Major Evans, Ickenham, England, assignor to Glaxo Laboratories Limited, Greenford, England, a British company No Drawing. Application July 31, 1950, Serial No. 176,912. In Great Britain August 18, 1949

11 Claims. (Cl. 260—631)

This invention is concerned with improvements in or relating to the preparation of a new unsaturated carbinol, namely 6-methyl-8-(1'-hydroxy - 2':6':6' - trimethylcyclohexyl) octa - 3:5-dien-7-yn-2-ol, which may be represented by the following structural formula

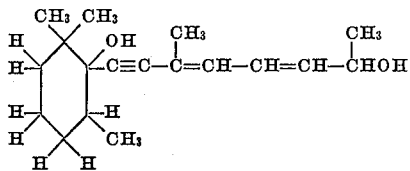

and which is useful in the synthesis of vitamin A and related substances.

It has been found that the new carbinol can conveniently be prepared by reacting a halogeno magnesium derivative of 6-methylocta-3:5-dien-7-yn-2-ol with 2:6:6-trimethylcyclohexanone in the presence of an inert solvent and subsequently decomposing the resulting complex. Although it is not desired to limit the invention by any theoretical considerations it is believed that the reaction may be represented as follows:

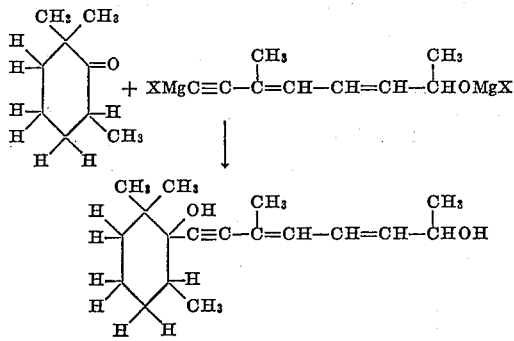

where X is chlorine or bromine.

Accordingly the invention comprises the new compound, 6 - methyl-8-(1'-hydroxy-2':6':6'-trimethylcyclohexyl) -octa-3:5-dien-7-yn-2-ol.

According to a further feature of the invention there is provided a process for the preparation of a new unsaturated carbinol namely 6-methyl-8-(1' - hydroxy - 2':6':6' - trimethylcyclohexyl) -octa-3:5-dien-7-yn-2-ol in which a halogeno magnesium derivative of 6-methylocta-3:5-dien-7-yn-2-ol of the general formula

(where X may be chlorine or bromine) is reacted with 2:6:6-trimethylcyclohexanone in the presence of an inert solvent as herein defined and the resulting organomagnesium complex is decomposed to yield the desired carbinol.

The term "inert solvent" as used herein means an organic solvent which has no demonstratable action on the reactants or the products of the reaction, other than the normal action of solvents in Grignard reactions. It is preferable to use aliphatic and cyclo aliphatic ethers having from 4–10 carbon atoms, for example, diethyl ether, di-n-butyl ether, dioxan and tetrahydrofuran; other inert solvents such as benzene or anisole may be used alone or in conjunction with these solvents. It is also preferable that the solvent used should be as dry as possible.

The halogeno-magnesium derivative may be prepared by conventional methods. It is preferable, according to a further feature of the invention, to prepare this derivative by reacting 6-methyl-octa-3:5-dien-7-yn-2-ol with approximately 2 mols of an alkyl Grignard reagent, for example ethyl magnesium bromide. This reaction is preferably carried out at a temperature within the range of from 0 to 60° C., and it is preferably effected in an inert atmosphere, and preferably in the same solvent as that in which the next stage of the process is to be carried out.

The next stage of the process, namely the reaction between the halogeno magnesium derivative and the trimethylcyclohexanone is preferably carried out at temperatures within the range of from —20° C. to +60° C. for several hours. This reaction is preferably also carried out in an inert atmosphere, for example an atmosphere of nitrogen, and it is generally desirable to have present a small quantity of an anti-oxidant, e. g. hydroquinone. As already stated it is preferable to carry out this reaction in the same solvent as that used for the formation of the halogeno magnesium compound.

The decomposition of the organo-magnesium complex may be carried out by conventional methods, for example by the use of water which may contain other reagents. It is preferable to use an aqueous solution of ammonium chloride for the decomposition, which may for example be effected at or slightly below room temperature.

The stated new carbinol in the purest form that has been so far obtained has the following characteristics $E_{1cm}^{1\%}$ 1171 and 854
$\epsilon$ 32300 and 23600

It will be readily understood that the above characteristics will be liable to variation according to the purity of any particular sample of the new carbinol.

The unsaturated carbinol 6-methylocta-3:5-dien-7-yn-2-ol may be prepared by the method described in the copending application of Ian Morris Heilbron et al., Serial No. 148,263, filed March 7, 1950.

In order that the invention may be well understood, the following examples are given as illustrations:

Example 1

6-methylocta-3:5-dien-7-yn-2-ol (13.6 g.) in dry ether (50 c. c.) was added dropwise in an atmosphere of nitrogen to a stirred solution of ethyl magnesium bromide (prepared from magnesium 5.34 g. in ether 200 c. c.) containing a trace of hydroquinone.

The mixture was refluxed for 30 minutes; after cooling to room temeprature, 2:6:6-trimethylcyclohexanone (14.0 g.) in dry ether (50 c. c.) was added slowly over a period of two hours. After refluxing for 30 minutes the mixture was allowed to cool to room temperature and the complex decomposed by the addition of cooled saturated ammonium chloride solution (100 c. c.) The product was extracted with ether, the ethereal solution washed with saturated sodium bicarbonate soltuion and dried over anhydrous sodium sulphate.

Removal of the solvent and distillation of the resdiue gave 6-methyl - 8 - (1'-hydroxy-2':6':6'-trimethylcyclohexyl) - octa - 3:5 - dien-7-yn-2-ol (12.6 g.; 46%) as a very viscous yellow gum B. P. 110–120°/$10^{-5}$ mm., $n_D^{14°}$ 1.5458

Light absorption, max. 2690 A.
$E_{1\,cm.}^{1\%}$ 908.
$\epsilon$ 25,100.

Infl., 2750–2830 A.
$E_{1\,cm.}^{1\%}$ 643.
$\epsilon$ 17,800.

Active hydrogen (Zerewitinoff) 1.98

Example 2

6-methyl-octa-3:5-dien-7-yn-2-ol (13.6 g.) in dry dioxan (50 c. c.) was added dropwise in an atmosphere of nitrogen to a stirred solution of ethyl magnesium chloride (prepared from magnesium (5.34 g.) in ether (200 c. c.) containing a trace of hydroquinone. The mixture was refluxed for 30 minutes; after cooling to room temperature 2:6:6-trimethylcyclohexanone (14.0 g.) in dry dioxan (50 c. c.) was added slowly over a period of 1½ hours. After refluxing for 30 minutes the mixture was allowed to cool to room temperature and the complex decomposed by the addition of 2N ammonium hydroxide (100 c. c.). The product was extracted with ether, the ethereal solution washed with saturated sodium bicarbonate and dried over anhydrous sodium sulphate. The removal of the solvent and distillation of the residue gave 6-methyl-8-(1'-hydroxy-2':6':6'-trimethylcyclohexyl) octa-3:5-dien-7-yn-2-ol. (8.5 g.; 31%) B. P. 120°/$10^{-5}$ mm., $n_D^{14}$ 1.5448

Light absorption maximum at 269 and 280 m$\mu$ $E_{1\,cm.}^{1\%}$ 1171 and 854, $\epsilon$ 32,300 and 23,600 respectively.

Example 3

6-methyl-octa-3:5-dien-7-yn-2-ol (13.6 g.) in dry n-butyl ether (50 c. c.) was added dropwise in an atmosphere of nitrogen to a stirred solution of ethyl magnesium bromide (prepared from magnesium 5.34 g. in n-butyl ether 200 c. c.) containing a trace of hydroquinone. The mixture was heated at 50° for 1 hour; after cooling to room temperature 2:6:6-trimethylcyclohexanone (14.0 g.) in dry n-butyl ether (50 c. c.) was added over a period of 3 hours. After heating at 50° for 1 hour the mixture was allowed to cool to room temperature and the complex decomposed by the addition of cooled 2N hydrochloric acid (110 c. c.). The product was extracted with ether, the ethereal solution washed with saturated sodium bicarbonate and dried over anhydrous sodium sulphate. The removal of the solvent at reduced pressure and distillation of the residue gave 6-methyl-8-(1'-hydroxy - 2':6':6' - trimethylcyclohexyl) octa-3:5-dien-7-yn-2-ol. (6.05 g. 22%), B. P. 120°/$10^{-5}$ mm. $n_D^{14}$ 1.5472

Light absorption maxima 269, 280 m$\mu$ $E_{1\,cm.}^{1\%}$ 308, 356.

$\epsilon$ 8,500 and 10,000 respectively.

Example 4

6-methyl-octa-3:5-dien-7-yn-2-ol (13.6 g.) in dry tetrahydrofuran (50 c. c.) was added dropwise in an atmosphere of nitrogen to a stirred solution of ethyl magnesium bromide (prepared from magnesium 5.34 g. in tetrahydrofuran 200 c. c.) containing a trace of hydroquinone. The mixture was refluxed for 30 minutes and after cooling to room temperature 2:6:6-trimethylcyclohexanone (14.0 g.) in dry tetrahydrofuran (50 c. c.) was added slowly over 1 hour. The mixture was stirred for a further hour at room temperature and the gelatinous complex decomposed by the addition of saturated ammonium chloride solution (100 c. c.). The product was extracted with ether, the ethereal solution washed with saturated sodium bicarbonate solution and dried over anhydrous sodium sulphtae. The removal of the solvent and distillation of the residue gave 6 - methyl - 8 - (1'hydroxy-2':6':6'-trimethylcyclohexyl) octa-3:5:dien-7-yn-2-ol. (13.3 g.; 48%) $n_D^{14}$ 1.5405.

Light absorption maxima 269, 280 m$\mu$ $E_{1\,cm.}^{1\%}$ 862, 659.

$\epsilon$ 23,800 and 18,200 respectively.

I claim:

1. As a new compound, 6-methyl-8-(1'-hydroxy - 2':6':6' - trimethylcyclohexyl) - octa-3:5-dien-7-yn-2-ol represented by the following structural formula $$\text{(structural formula of 6-methyl-8-(1'-hydroxy-2':6':6'-trimethylcyclohexyl)-octa-3:5-dien-7-yn-2-ol)}$$

2. A process for the preparation of 6-methyl-8 - (1' - hydroxy - 2':6':6' - trimethylcyclohexyl) - octa - 3:5 - dien - 7 - yn - 2 - ol which comprises first reacting a halogeno magnesium derivative of 6-methylocta-3:5-dien-7-yn-2-ol having the general formula $$\text{XMg}-\text{C}\equiv\text{C}-\overset{\underset{\displaystyle |}{\text{CH}_3}}{\text{C}}=\text{CH}-\text{CH}=\text{CH}-\overset{\underset{\displaystyle |}{\text{CH}_3}}{\text{CH}}\text{OMgX}$$

where X is selected from the group consisting of chlorine and bromine, with 2:6:6-trimethylcyclohexanone in the presence of an inert organic solvent selected from the group consisting of aliphatic and cyclic aliphatic ethers having from 4–10 carbon atoms at a temperature within the range of from −20° to +60° C. and then decomposing the resulting organo magnesium complex with water.

3. A process as claimed in claim 2 in which said solvent is diethyl ether.

4. A process as claimed in claim 2 in which said solvent is di-n-butyl ether.

5. A process as claimed in claim 2 in which said solvent is dioxan.

6. A process as claimed in claim 2 in which said solvent is tetrahydrofuran.

7. A process as claimed in claim 2 in which the reaction is carried out in an inert atmosphere and in the presence of an anti-oxidant.

8. A process as claimed in claim 2 in which the organo magnesium complex is decomposed with an aqueous solution of ammonium chloride.

9. A process for the preparation of 6-methyl-8 - (1' - hydroxy - 2':6':6' - trimethylcyclohexyl)-octa-3:5-dien-7-yn-2-ol which comprises first reacting 6-methylocta-3:5-dien-7-yn-2-ol with approximately 2 moles of an alkyl Grignard reagent in an inert organic solvent selected from the group consisting of aliphatic and cyclic aliphatic ethers containing from 4–10 carbon atoms, then reacting the product with 2:6:6-trimethylcyclohexanone in the presence of said inert organic solvent and at a temperature within the range of from −20° to +60° C. and then decomposing the resulting organo magnesium complex with aqueous ammonium chloride to yield the desired carbinol.

10. A process as claimed in claim 9 in which the said alkyl Grignard reagent is ethyl magnesium bromide.

11. A process as claimed in claim 9 in which the reaction of 6-methylocta-3:5-dien-7-yn-2-ol with the alkyl Grignard reagent is carried out at a temperature of from 0°–60° C. in an inert atmosphere.

RONALD MAJOR EVANS.

REFERENCES CITED

The following references are of record in the file of this patent:

UNITED STATES PATENTS

| Number | Name | Date |
| --- | --- | --- |
| 2,415,834 | Milas | June 12, 1947 |
| 2,451,739 | Isler | Oct. 19, 1948 |
| 2,475,139 | Isler et al. | July 5, 1949 |
| 2,531,567 | Heilbron et al. | Nov. 28, 1950 |
| 2,567,572 | Milas | Sept. 11, 1951 |
| 2,579,658 | Evans et al. | Dec. 25, 1951 |

OTHER REFERENCES

Thompson et al., J. Amer. Chem. Soc., vol. 63, pp. 752–55, (1941).

Tome, Thesis for BS degree at Mass. Inst. of Tech., May 23, 1947, pp. 4–6, 10 and 11.